N. LEWSEN.
TIRE TOOL.
APPLICATION FILED MAR. 19, 1920.
1,378,696.
Patented May 17, 1921.
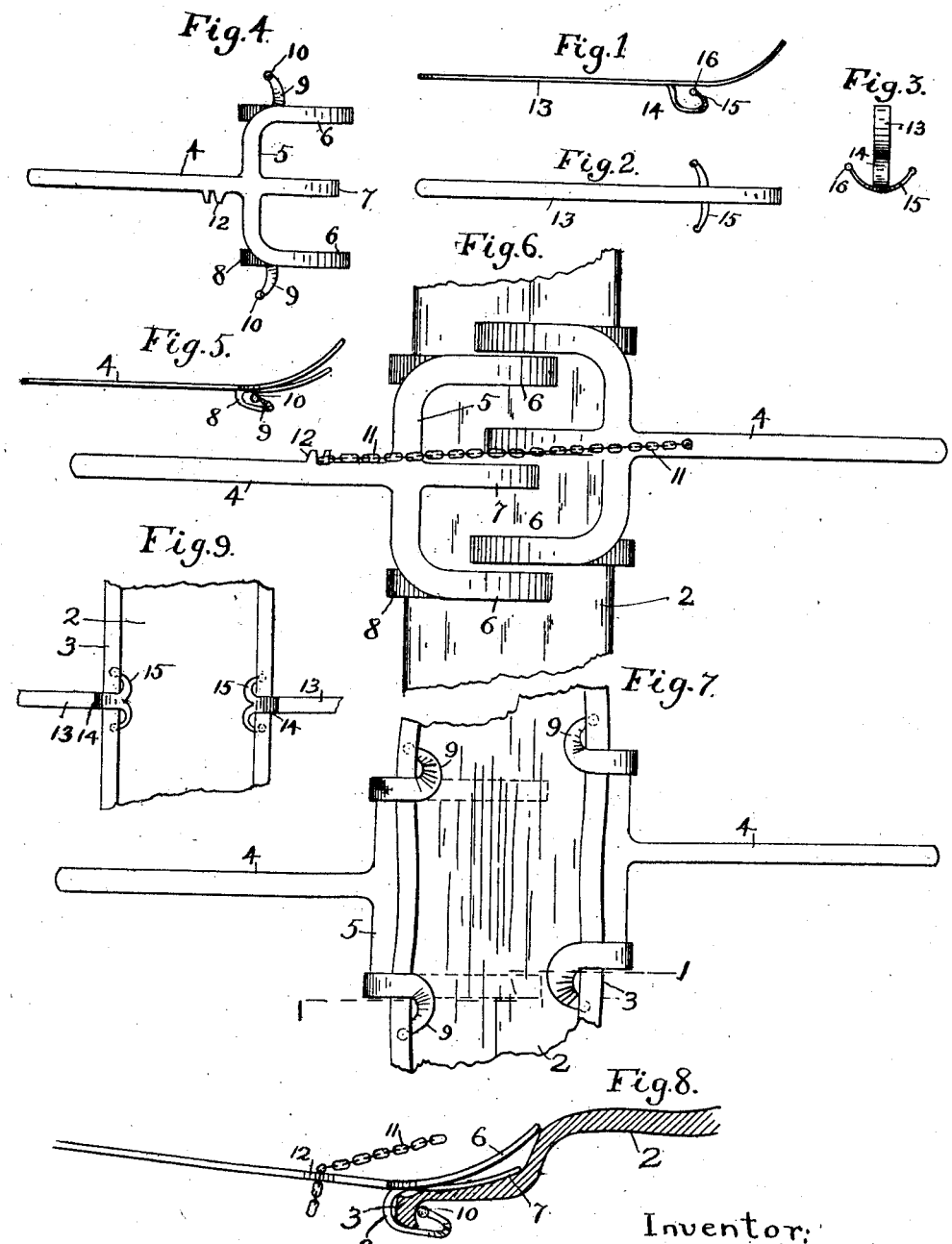

UNITED STATES PATENT OFFICE.

NICOLAUS LEWSEN, OF PORTLAND, MAINE.

TIRE-TOOL.

1,378,696.   Specification of Letters Patent.   Patented May 17, 1921.

Application filed March 19, 1920. Serial No. 367,202.

*To all whom it may concern:*

Be it known that I, NICOLAUS LEWSEN, a citizen of the United States, residing at Portland, in the county of Cumberland and State of Maine, have invented certain new and useful Improvements in Tire-Tools, of which the following is a specification.

My invention relates to tire tools and it relates particularly to tools such as are designed for spreading apart the beads of the tire with the purpose of examining or working on the inside surface of the shoe.

The spreading open of the tires has hitherto been done by expensive and permanent jacks which required the application of much force and the object of my invention is to produce a tire tool which may be readily operated by one person, which may be cheaply made and which will constitute an effective tool for spreading the tire.

The invention consists essentially of a handle bar having near its end a hook offset from the bar and extending toward the operative end of the tool for engaging the bead of the tire, the hook having a point which extends laterally and thence upwardly and rearwardly so that it will firmly engage with the bead of the tire and allow the tire to be partially or wholly turned. The device may be used with a simple handle bar or with a bar having a bifurcated end with a hook on each end.

Where two hooks are used, separated laterally from each other, the point of each hook is turned away from the handle bar proper or when a single tool is made for light work, then the hook has a double end, each part extending laterally, rearwardly and upwardly considering the normal position of the tool as lying with the hook underneath.

I have illustrated my invention by means of the accompanying drawing in which I have shown two forms of my tire tool, one for heavy and one for light work.

Referring to the drawing:

Figure 1 is a side view of the light form of my device,

Fig. 2 is a plan and,

Fig. 3 is an end view of the same,

Fig. 4 is a plan of the heavy type of my invention,

Fig. 5 is a side or edge view,

Fig. 6 is a view on the outside of the tire when the same is spread open with two of my tire tools in position, Fig. 7 is the same as the last view looking on the inside surface of the tire, Fig. 8 is a cross section through the spread open tires taken on the line 1—1 of Fig. 7 with the tire tool in elevation, Fig. 9 is a plan view of the inside of a portion of a tire showing the same spread by the light form of tire tools.

Considering first Figs. 4 to 8 showing the heavier type of my tire tool, 2 indicates the tire or shoe proper and 3 is the bead thereof.

The handle bar 4 is preferably made in the form of a substatially straight bar which may be formed to be readily grasped by the hand of the operator. The working end of the tool is bifurcated and as shown, a cross bar 5 extends out from each side of the handle bar and at the ends of the cross bar 5 are the two bifurcated ends 6—6 of the main bar. These bifurcated ends bend or curve upward toward the end.

As shown, the main handle bar 7 extends beyond the bar 5 to form a longitudinal tire engaging arm and has a slight upward turn toward the end. It is formed slightly lower than the bifurcated ends 6, 6 for the purpose of forcing the central portion of the tire a little farther up than the end portions when the inner surface of the tire is to be worked on.

Projecting downward from the base of each of the bifurcations 6 is a hook 8 with an engaging end 9 which is turned laterally outward away from the center line of the tool and thence bent rearwardly and upwardly, terminating in a ball end 10, to prevent the end of the hook from injuring the tire.

When this hook 8 is hooked over the bead of the tire, the end of the hook turns backwardly and catches under the bead in such a way that the latter will be solidly held against any tendency to double back to its original position.

As the tool is turned, using the hook as a fulcrum the three ends 6, 6 and 7 will take a bearing on the outside or tread of the shoe and tend to turn the tire inside out.

When the tire is engaged by two of these tools at the same time both beads are spread apart, the tread is pressed inward and the center of the tire on the inside is brought to a convex position.

The two tools after they have spread and turned the tire may be locked in extended position by a chain or cord 11 which is secured permanently in one tool and fastened detachably in the other by means of a slot 12 formed in the side of the tool handle.

For light work and for opening up a light tire so that it may be examined, I make use of the light form of my device as shown in Figs. 1, 2 and 3.

The handle bar 13 extends as a simple bar from end to end turning up at the inner end as already described in the case of the heavier bar.

The hook 14 is formed on the underside some distance back from the end of the bar and the hook has a double end 15 bent laterally in opposite directions. Each of these double ends 15 is bent laterally rearwardly and upwardly, the same as the single hooks already described and they terminate with ball ends 16 to avoid injury to the material of the tire.

The end of the handle bar of the single tool is sharpened so that it will be a handy tool for prying the tire from the rim and may be of use in many ways around an automobile.

The surfaces of these tools are rounded and finished off so that injury to the tire will be avoided.

I claim:—

1. A tire tool including a handle bar having a longitudinal arm arranged to engage the exterior of a tire for turning the same inside out, and means located at opposite sides of said arm for engaging the tire at the bead thereof said means having hook-shaped terminal portions projecting laterally of the tool and extending outwardly at a direction longitudinally of the tire.

2. A tire tool including a handle bar having an arm arranged to engage the exterior of the tire for turning the same inside out and presenting a convex face to the same and conforming to the contour of the tire and means located at opposite sides of the said arm for engaging the tire at the bead thereof, said means having hook-shaped terminal portions projecting laterally of the tool and extending outwardly longitudinally of the tire.

3. A tire tool including a handle bar having a longitudinal arm arranged to engage the exterior of the tire for turning the same inside out and means located at opposite sides of the said arm for engaging the tire at the bead thereof said means projecting laterally from the handle bar and having terminal portions extending outwardly longitudinally of the tire.

4. A tire tool including a pair of devices each comprising a handle bar having a longitudinal arm arranged to engage the exterior of the tire for turning the same inside out and means located at opposite sides of the said arm for engaging the tire at the bead thereof and having terminal portions projecting laterally of the device and extending longitudinally of the tire, and means for connecting the said devices for retaining the same at an acute angle to each other for holding the tire turned inside out.

5. A tire tool including a handle bar having a curved longitudinal arm arranged to engage the exterior of a tire for turning the same inside out and presenting a convex face to and conforming to the configuration of the said tire when the same is turned inside out and means located at opposite sides of the said arm for engaging the tire at the bead thereof said means having substantially hook-shaped terminal portions projecting laterally of the tool and extending outwardly longitudinally of the tire and provided with terminal heads of substantially ball shape.

6. A tire tool including a pair of tire engaging devices each including a handle bar having an arm arranged to engage the exterior of the tire for turning the same inside out and presenting a convex face to and conforming to the configuration of the tire when the same is turned inside out, and means located at opposite sides of the arm for engaging the tire at the bead thereof, said means having terminal portions projecting laterally to and extending outwardly longitudinally of the tire, means for connecting the said devices for retaining the same at an acute angle to each other for holding the tire turned inside out, the arms of the two devices each being arranged side by side and forming an arched support for the tire and being of a length to extend substantially half way across the tire from bead to bead and the tire engaging means being staggered whereby the tire tool is adjustable to fit tires of different widths.

7. A tire tool comprising a handle bar provided with a curved arm arranged to engage a tire exteriorly thereof for turning the tire inside out, said handle bar being provided at a point intermediate of its ends with a cross bar extending laterally of each side of the handle bar, and approximately semicircular tire engaging portions carried by the said cross bar and having terminal portions extending laterally of the tool and outwardly longitudinally of the tire.

8. A tire tool including a pair of tire engaging devices each comprising an intermediate tire engaging arm arranged to engage the tire exteriorly thereof for turning the tire inside out, and means located at opposite sides of the said arm for engaging the tire at the beads thereof said means having terminal portions projecting laterally of the device and extending outwardly longitudinally of the tire and means for connecting the said devices for holding the tire turned inside out.

9. A tire tool including an intermediate tire engaging arm presenting a convex face to the exterior of the tire and conforming to the configuration of the same when the tire is turned inside out, and means located at opposite sides of said arm for engaging the tire at the bead thereof, said means having substantially hook-shaped terminal portions projecting laterally of the tool and extending outwardly longitudinally of the tire.

10. A tire tool, including a handle bar having a longitudinal arm arranged to engage the exterior of a tire for turning the same inside out, and means located on opposite sides of said arm for engaging the tire at the bead thereof, said means having hook-shaped terminal portions with rounded ends projecting laterally of the tool and extending outwardly at a direction longitudinally of the tire.

In testimony whereof I have affixed my signature.

NICOLAUS LEWSEN.